United States Patent
Hwang et al.

(10) Patent No.: US 10,849,012 B2
(45) Date of Patent: Nov. 24, 2020

(54) METHOD FOR PERFORMING DECODING BY TERMINAL AND TERMINAL FOR PERFORMING SAME METHOD

(71) Applicant: LG ELECTRONICS INC., Seoul (KR)

(72) Inventors: Seunggye Hwang, Seoul (KR); Bonghoe Kim, Seoul (KR); Jongwoong Shin, Seoul (KR); Kijun Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/464,220

(22) PCT Filed: Dec. 4, 2017

(86) PCT No.: PCT/KR2017/014059
§ 371 (c)(1),
(2) Date: May 24, 2019

(87) PCT Pub. No.: WO2018/101805
PCT Pub. Date: Jun. 7, 2018

(65) Prior Publication Data
US 2019/0394673 A1  Dec. 26, 2019

Related U.S. Application Data

(60) Provisional application No. 62/429,081, filed on Dec. 2, 2016.

(51) Int. Cl.
*H04W 28/04* (2009.01)
*H04L 1/00* (2006.01)
(Continued)

(52) U.S. Cl.
CPC ........... *H04W 28/04* (2013.01); *H04L 1/0057* (2013.01); *H04L 1/0072* (2013.01); *H04W 28/06* (2013.01); *H04W 48/08* (2013.01)

(58) Field of Classification Search
CPC ..... H04W 28/04; H04W 28/06; H04W 48/08; H04W 48/12; H04L 1/0057; H04L 1/0072; H04L 1/0061; H04L 1/00
See application file for complete search history.

(56) References Cited

U.S. PATENT DOCUMENTS

2016/0013887 A1  1/2016  Shen et al.
2016/0164629 A1  6/2016  Ahn et al.
(Continued)

OTHER PUBLICATIONS

Huawei, HiSilicon, "Evaluation of channel coding schemes for control channel," 3GPP TSG-RAN WG1 Meeting #86b, R1-1608863, Oct. 2016, 11 pages.
(Continued)

*Primary Examiner* — Kabir A Timory
(74) *Attorney, Agent, or Firm* — Lee Hong Degerman Kang Waimey

(57) ABSTRACT

A disclosure of the present specification provides a method for performing decoding by a terminal. The method may comprise the steps of: receiving a signal including an information bit and a frozen bit from a base station; and decoding the signal on the basis of a polar code, wherein the step of decoding is performed using a known bit block included in the frozen bit, the terminal and the base station have already known the known bit block before reception of the signal, and the known bit block is generated using an RNTI.

8 Claims, 15 Drawing Sheets

(51) Int. Cl.
   *H04W 28/06*   (2009.01)
   *H04W 48/08*   (2009.01)

(56) References Cited

U.S. PATENT DOCUMENTS

2017/0155405 A1\*  6/2017  Ge ........................ H04L 1/0058
2018/0048418 A1\*  2/2018  Ge ........................ H04L 1/0038

OTHER PUBLICATIONS

Huawei, HiSilicon, "Details of the Polar code design," 3GPP TSG-RAN WG1 Meeting #87, R1-1611254, Nov. 2016, 17 pages.
Huawei, HiSilicon, "Performance evaluation of channel coding schemes for control channel," 3GPP TSG-RAN WG1 Meeting #87, R1-1611257, Nov. 2016, 13 pages.

\* cited by examiner

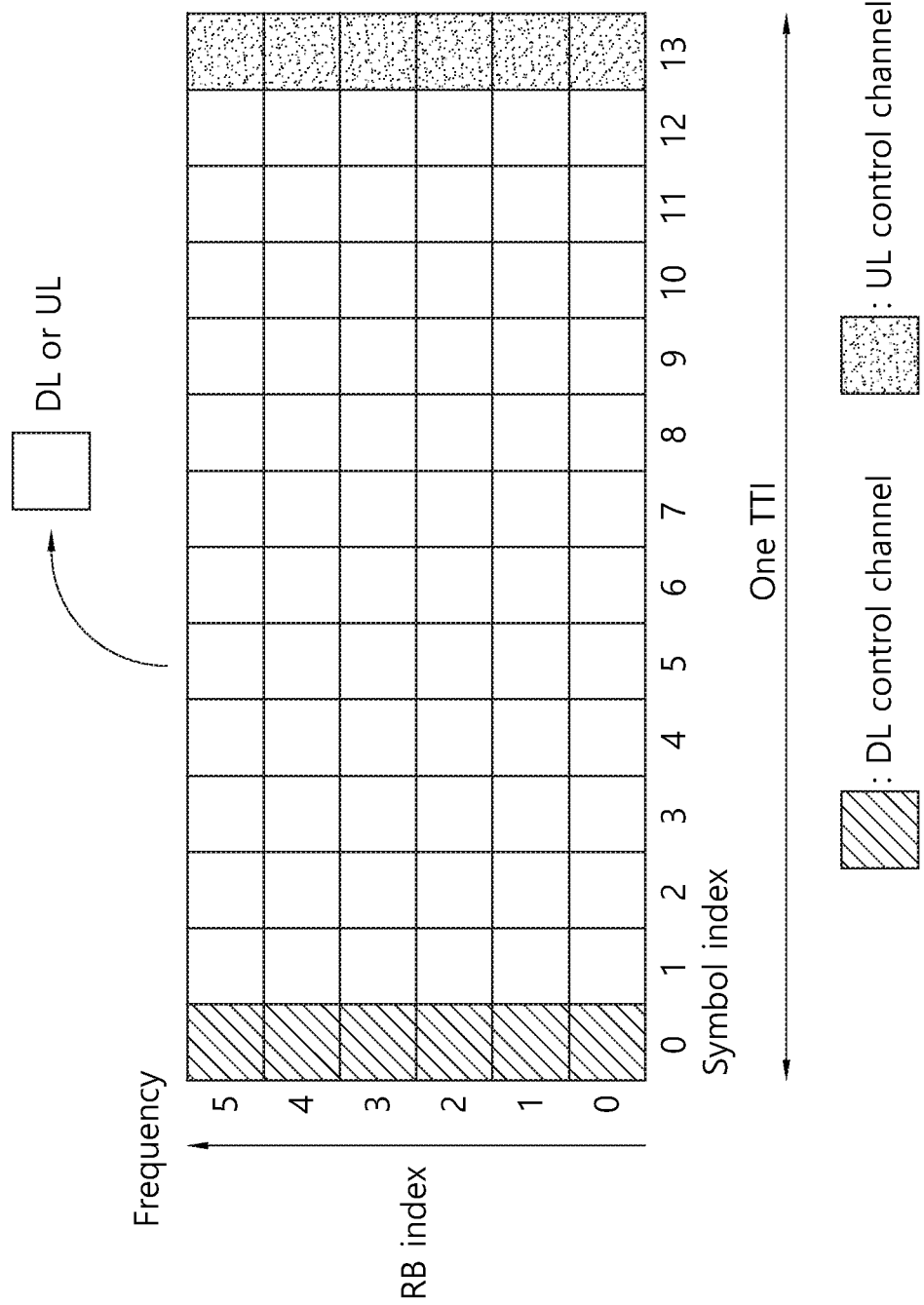

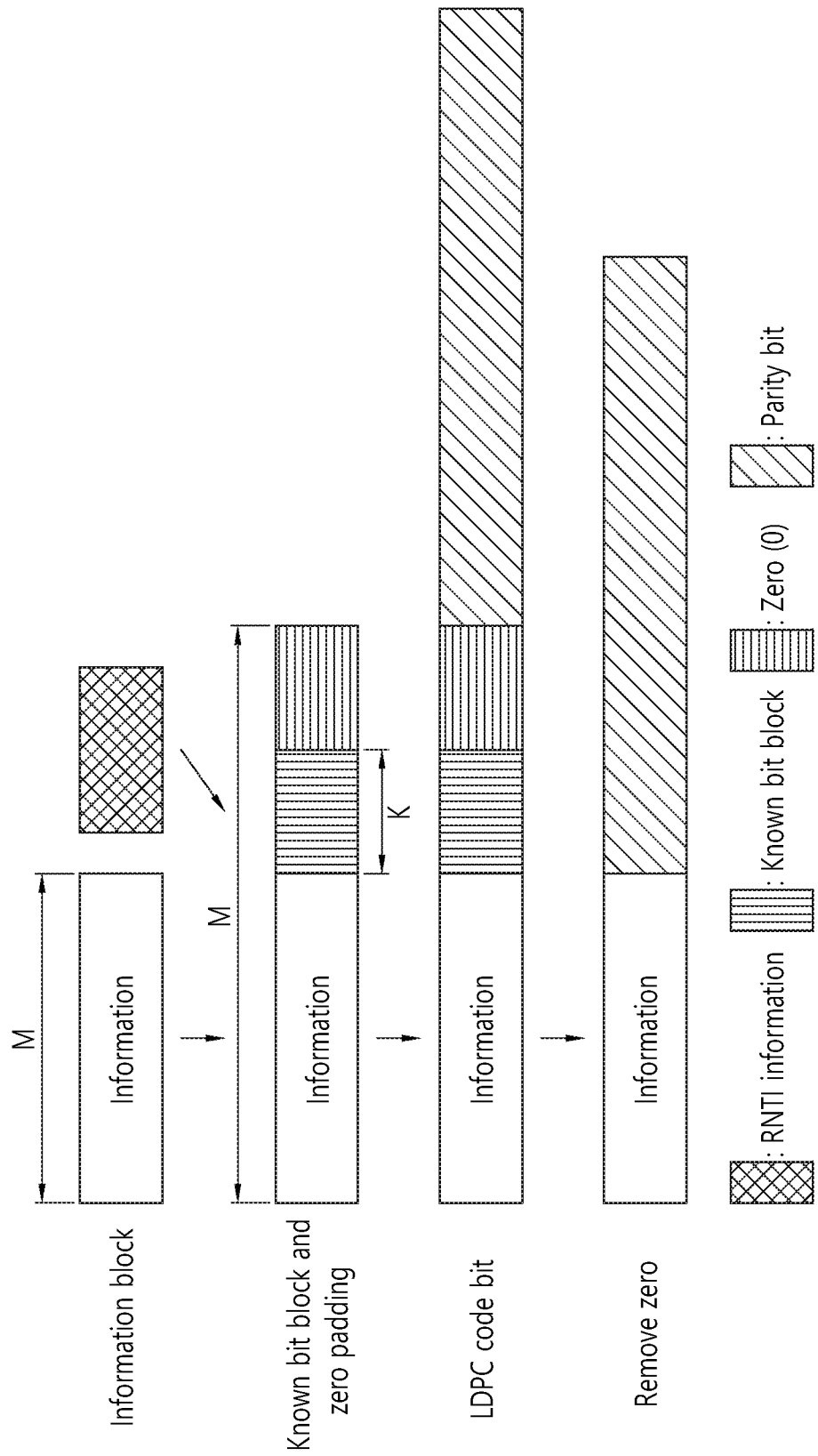

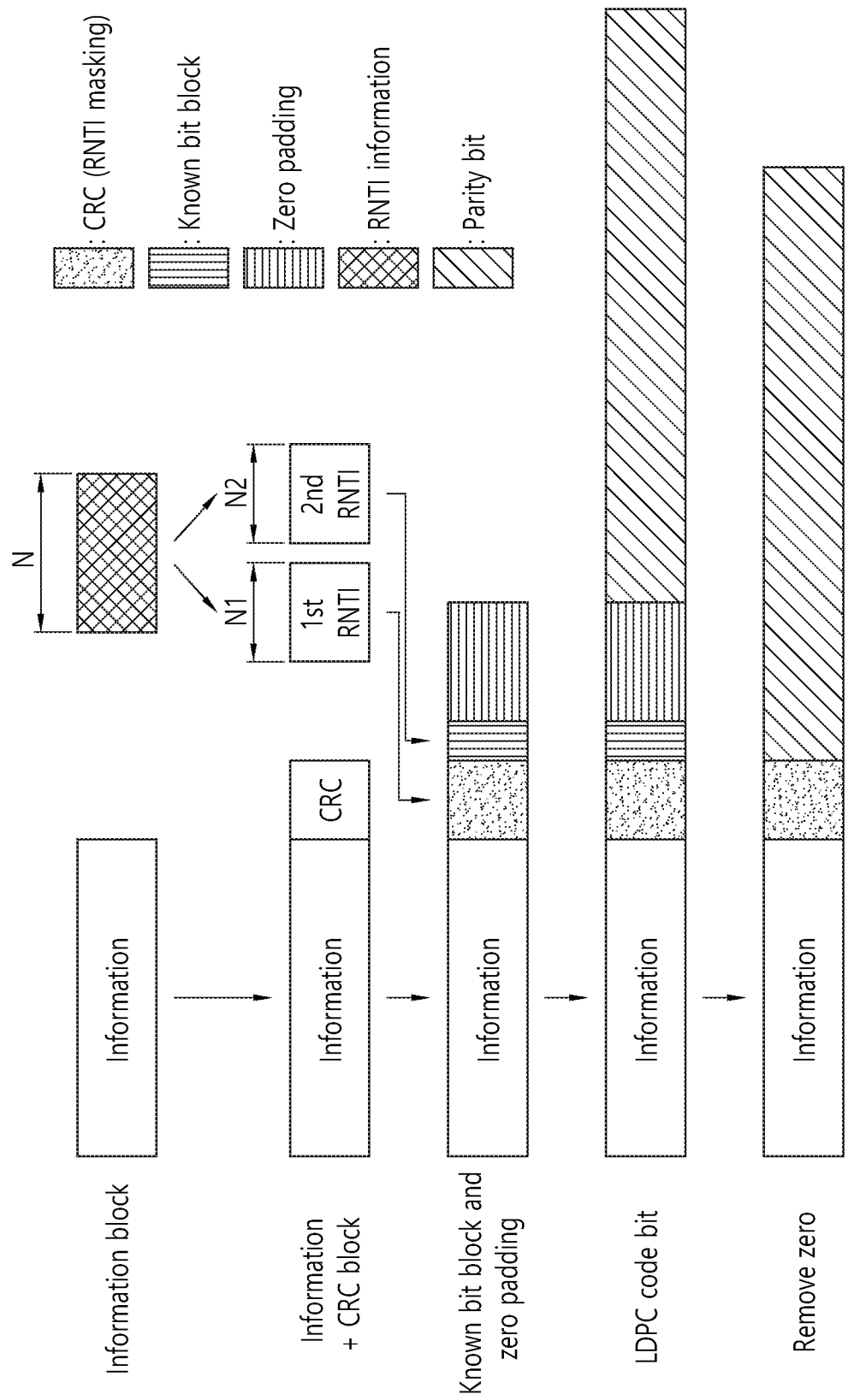

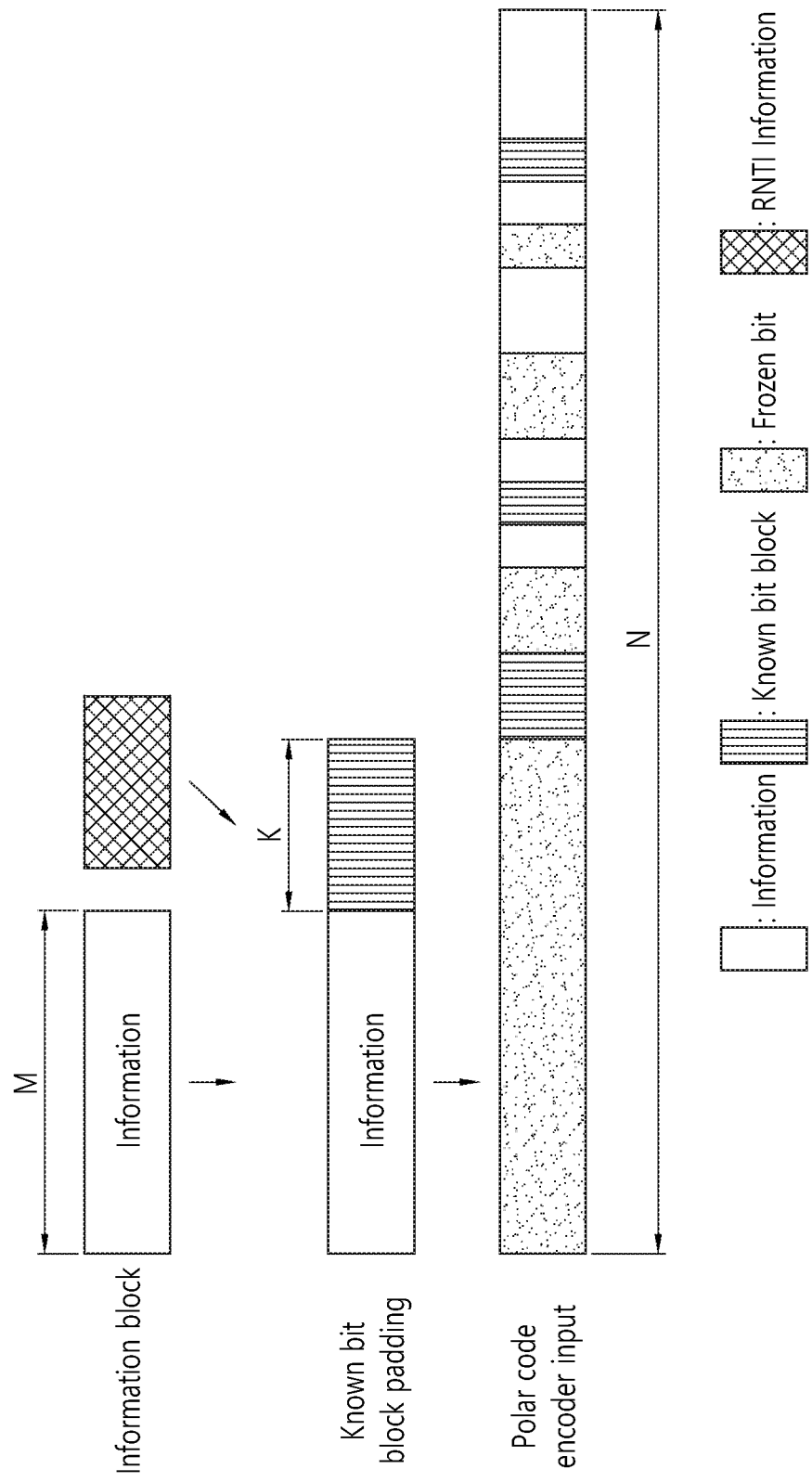

METHOD FOR PERFORMING DECODING BY TERMINAL AND TERMINAL FOR PERFORMING SAME METHOD

CROSS-REFERENCE TO RELATED APPLICATIONS

This application is the National Stage filing under 35 U.S.C. 371 of International Application No. PCT/KR2017/014059, filed on Dec. 4, 2017, which claims the benefit of U.S. Provisional Application No. 62/429,081, filed on Dec. 2, 2016, the contents of which are all hereby incorporated by reference herein in their entirety.

BACKGROUND OF THE INVENTION

Field of the Invention

The present invention relates to a method for performing decoding by a terminal, and more particularly, to a method for decoding of a signal to which a known bit is padded to transmit RNTI information when LDPC or polar code is used in a channel coding technique in next generation new radio access technology (New RAT).

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

It is anticipated that in the next generation mobile communication, that is, the 5th generation mobile communication, data service with minimum speed of 1 Gbps is expected to be realized.

Turbo codes, polar codes, and LDPC codes are considered as channel coding techniques in the 5th generation mobile communication.

Meanwhile, a discussion has been progressed to reduce overhead of cyclical redundancy check (CRC) which is used in the New RAT, and methods for reducing a length of CRC also has been discussed. However, in the case that a length of CRC is reduced, there is a problem that a size of an RNTI masked by CRC is decreased in comparison with the LTE system.

SUMMARY OF THE INVENTION

Accordingly, the disclosure of the present specification aims to solve the above-mentioned problems.

One embodiment provides a method for performing decoding by a terminal, the method comprising: receiving, from a base station, a signal including an information bit and a frozen bit; and decoding the signal based on a polar code, wherein the decoding the signal is performed by using a known bit block included in the frozen bit, wherein the terminal and the base station know the known bit block before receiving the signal, and wherein the known bit block is generated by using a radio network temporary identifier (RNTI).

A position of the known bit block is determined after a position of the information bit is determined first in the signal, and wherein, the position of the known bit block is determined among remaining positions except a position of the information bit determined in the signal according to a same criterion as a criterion of determining the position of the information bit.

When an error is not occurred as a result of decoding, further comprising, by the terminal, determining that the RNTI is received, which is expected to be received by the known bit block included in the frozen bit.

When an error is occurred as a result of decoding, further comprising, by the terminal, determining that an RNTI is received, which is different from an RNTI expected to be received by the known bit block included in the frozen bit.

When a cyclical redundancy check (CRC) bit has higher reliability than the known bit block, wherein the CRC bit includes a first RNTI of which importance is high RNTIs received by the terminal, and wherein the known bit block includes a second RNTI of which importance is low among the RNTIs, and when the known bit block has higher reliability than the CRC bit, wherein the known bit block includes a first RNTI of which importance is high among RNTIs received by the terminal, and wherein the CRC bit includes a second RNTI of which importance is low among the RNTIs When the terminal decodes the signal sequentially, wherein the known bit block is positioned such that the known bit block is decoded first rather than the information bit.

Another embodiment provides a terminal for performing decoding, comprising: a radio frequency (RF) unit configured to receive a signal including an information bit and a frozen bit; and a processor configured to control the RF unit and decode the signal based on a polar code, wherein the processor is configured to perform decoding by using a known bit block included in the frozen bit, wherein the terminal and the base station know the known bit block before receiving the signal, and wherein the known bit block is generated by using a radio network temporary identifier (RNTI).

According to the disclosure of the present specification, it is possible to mask an RNTI of sufficient size while reducing the overhead of the CRC by using known bit blocks.

BRIEF DESCRIPTION OF THE DRAWINGS

FIG. 3 illustrates an example of a subframe type in NR.

FIG. 5 a diagram illustrating a method of a known bit block being padded when a channel coding is performed by using the LDPC.

FIG. 7 illustrates a method of masking RNTI by using a CRC and a known bit block when channel coding is performed by using the LDPC.

FIG. 9 illustrates a method of applying a known bit block when polar code is used according to an embodiment of the present invention.

DESCRIPTION OF EXEMPLARY EMBODIMENTS

Figure 1:
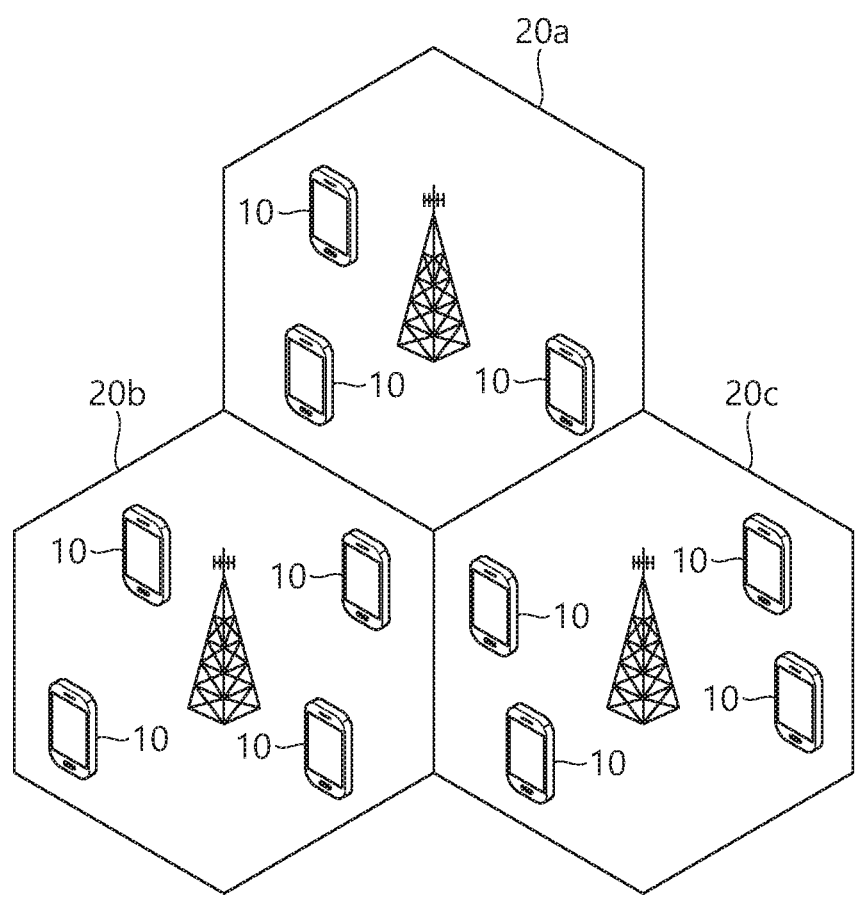
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
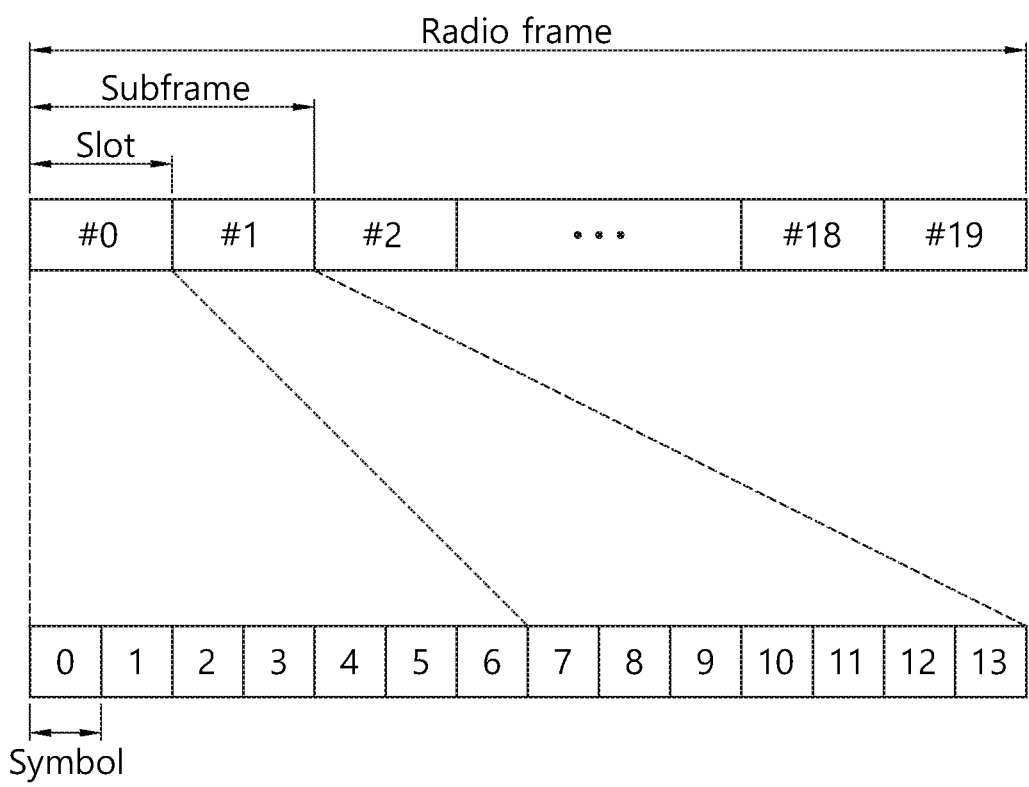
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

One slot includes NRB resource blocks (RBs) in the frequency domain. For example, in the LTE system, the number of RBs, that is, NRB, may be any one of 6 to 110.

The resource block (RB) is a resource allocation unit and includes a plurality of subcarriers in one slot. For example, in the case that one slot includes 7 OFDM symbols in the time domain and the RB includes 12 subcarriers in the frequency domain, one RB may include 7×12 resource elements (REs).

<Next-Generation Mobile Communication Network>

As mobile communication based on the 4G LTE/international mobile telecommunications (IMT) standard has been successfully commercialized, research into next-generation mobile communication (fifth-generation mobile communication) is ongoing. The fifth-generation mobile communication system aims at higher capacity than 4G LTE and may increase the density of mobile broadband users and support device to device (D2D), high stability and machine type communication (MTC). Research into and development of the 5G mobile communication system aim at lower latency and lower battery consumption than the 4G mobile communication system to better implement the Internet of things. For such 5G mobile communication, new radio access technology (New RAT or NR) may be proposed.

In NR, a reception from a base station may use downlink subframes and a transmission to the base station may use uplink subframes. This scheme is applicable to paired spectra and unpaired spectra. A pair of spectra means that two carrier spectra are included for downlink and uplink operation. For example, in a pair of spectra, one carrier may include a pair of a downlink band and an uplink band.

FIG. 3 illustrates an example of a subframe type in NR.

The transmission time interval (TTI) shown in FIG. 3 may be referred to as a subframe or slot for NR (or new RAT). The subframe (or the slot) of FIG. 3 may be used in an NR (or new RAT) TDD system to minimize data transmission delay. As shown in FIG. 3, the subframe (or the slot) includes 14 symbols, similarly to a current subframe. The front symbol of the subframe (or the slot) may be used for a DL control channel and the rear symbol of the subframe (or the slot) may be used for a UL control channel. The remaining symbols may be used for DL data transmission or UL data transmission. According to such a subframe (or slot) structure, downlink transmission and uplink transmission may be sequentially performed in one subframe (or slot). Accordingly, downlink data may be received in the subframe (or the slot) and uplink ACK/NACK may be transmitted in the subframe (or the slot). Such a subframe (or slot) structure may be referred to as a self-contained subframe (or slot). When such a subframe (or slot) structure is used, a time required to retransmit data which has been erroneously received may be reduced, thereby minimizing final data transmission latency. In the self-contained subframe (or slot) structure, a time gap may be necessary in a process of switching from a transmission mode to a reception mode or from a reception mode to a transmission mode. To this end, in the subframe structure, when switching from DL to UL, some OFDM symbols may be set as a guard period (GP).

Requirements of the 5G system include latency, peak data rate, error correction, and the like. The 5G system, which will be used not only in a mobile communication system but also in ultra-high-resolution media streaming, the Internet of things, cloud computing, autonomous vehicles, and the like, aims at performance much higher than the requirements of the LTE system in various areas.

The 5G system aims at 1 ms which is ¹/₁₀ the latency of the LTE system. Such short latency is an important indicator in an area directly related to human life, such as autonomous vehicles. The 5G system aims at a high transmission rate. The 5G system is expected to provide high-capacity high-speed communication such as high-quality media service streaming services with a maximum transmission rate which is 20 times that of the LTE system and a sensible transmission rate which is 10 to 100 times that of the LTE system. Error correction capability reduces a data retransmission rate, thereby improving latency and a data transfer rate.

As a 5G channel coding method, a polar code, a low-density parity check code (LDPC code), and the like, have been considered.

The LDPC code is based on the characteristics of an LDPC iterative decoding scheme, in which error correction capability per bit is improved but calculation complexity per bit is maintained, by increasing the length of the code. In addition, since the code may be designed such that decoding operation is performed in parallel, decoding of a long code can be performed at a high speed.

Next, the polar code has low coding and low decoding complexity and is a first error correction code which has theoretically been proven to achieve a channel capacity in a general binary discrete memoryless symmetric channel. The LDPC code using the iterative decoding process, the polar code uses a combination of successive cancellation (SC) decoding and list decoding. In addition, the polar code improves performance through pipelining, unlike the LDPC for improving performance through a parallel process.

Figure 4A:
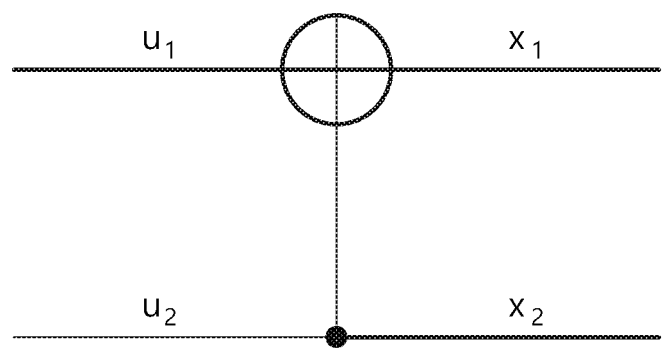
FIG. 4a illustrates the basic concept of a polar code and FIG. 4b illustrates the structure of an SC decoder.
Figure 4B:
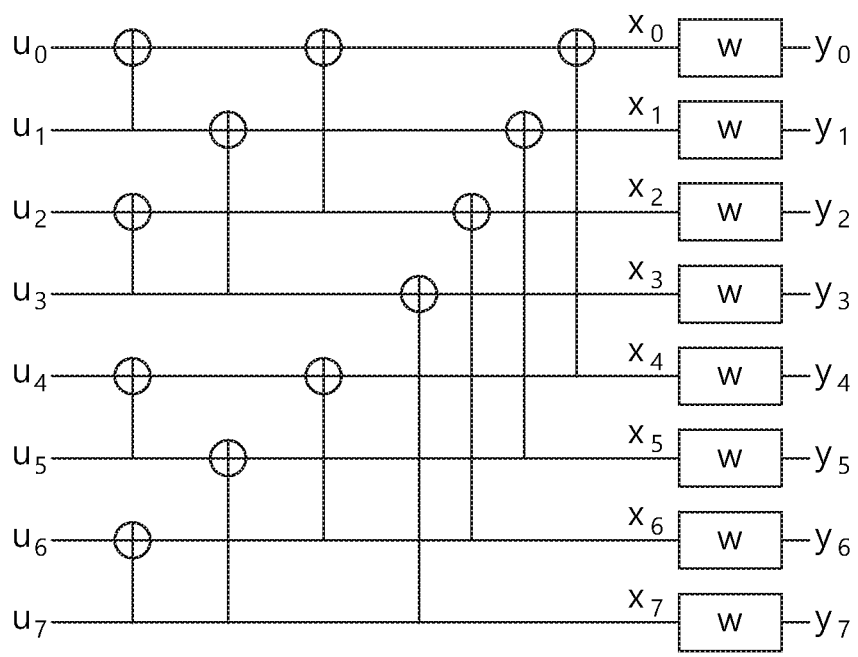

FIG. 4a illustrates the basic concept of a polar code and FIG. 4b illustrates the structure of an SC decoder.

Referring to FIG. 4a, different inputs u1 and u2 undergo different channels and thus x1 and x2 are output. At this time, it is assumed that input u2 passes through a relatively good channel and input u1 passes through a relatively bad channel. The channel means influence of an encoder. When the structure of FIG. 4a is repeated, input u2 passing through the good channel gradually becomes better and input u1 passing through the bad channel gradually becomes worse, thereby obtaining the structure shown in FIG. 4b. This is referred to as polarization.

The structure shown in FIG. 4b may be generated by a Kronocker product of a 2×2 kernel matrix. Accordingly, an encoder is always created in the form of the exponent of 2.

In FIG. 4b, it is assumed that the channel experienced by input u7 is better than the channel experienced by input u0. That is, it is assumed that the larger the index, the better the channel.

The polar code means a method of mapping data to a good channel and mapping a frozen bit (that is, known bit information such as 0) to a bad channel, using polarization effects.

At this time, a code rate is determined by (the number of data bits)/(the number of data bits+the number of frozen bits).

Meanwhile, a discussion has been progressed to reduce overhead of cyclical redundancy check (CRC) which is used in the New RAT, and methods for reducing a length of CRC also has been discussed. However, in the case that a length of CRC is reduced, there is a problem that a size of RNTI masked by CRC is decreased in comparison with the LTE system.

<Disclosure of the Present Specification>

According to the present specification, in the case that a system using the low-density parity-check code (LDPC) or the polar code transmits an information block with information for identifying a terminal such as an RNTI, a known bit may be padded in the information block. In the LTE system, the RNTI is masked in a CRC to distinguish the RNTI information in a control channel. However, as an attempt to decrease a length of CRC is progressed for reducing overhead of the CRC, a size of RNTI that the CRC may mask becomes decreased. Accordingly, to solve the problem that the size of RNTI is decreased, a method is proposed to distinguish a part or the whole RNTI by using a known bit block that is known by both a transmitter or a receiver.

In the present specification, the known bit block may mean a bit block that a system (or base station, etc.) transmitting a signal and a terminal receiving the signal know a part or the whole contents.

FIG. 5 a diagram illustrating a method of a known bit block being padded when a channel coding is performed by using the LDPC.

Referring to FIG. 5, in the case that RNTI is transmitted by using a known bit block, when a channel coding is performed by using the low-density parity-check code (LDPC), the shortening technique may be applied to the known bit block. That is, when encoding is performed by using the LDPC, zero bit is padded to match a bit size, and a known bit may be padded instead of the zero bit.

For example, in the case that there is information of M-bit size (M is a natural number) and there is a known bit block of K-bit size (K is a natural number), the size of information block for LDPC encoding may be L (L≥M+K (L is a natural number)). In this case, the LDPC encoding is performed by padding the known bit block to the information block, and a block corresponding to the known bit block may be removed from the information bit blocks that perform the LDPC encoding. That is, the block corresponding to the known bit block is not transmitted to the terminal.

The terminal may perform decoding with the removed information bit block including the known bit block corresponding to the RNTI that the terminal expects to receive.

The terminal receives the information bit block in which the known bit block is removed, but the terminal may perform decoding by using the RNTI information which is known in advance. As a result of the decoding, in the case that error is not existed in the received information bit block, the terminal may determine that the expected RNTI is included in the information bit block. On the contrary, in the case that error is existed in the received information bit block, the terminal may determine that a different RNTI which is different from the expected RNTI is received.

Referring to FIG. 5, the RNTI may be distinguished without increasing overhead in a signal transmitted by a base station (system). Although it is shown that zero padding is performed together with the known bit block in FIG. 5, but according to an embodiment, this may be changed. That is, according to a size of an LDPC encoder or a size of the known bit block, the zero padding may be existed or not existed.

Figure 6:
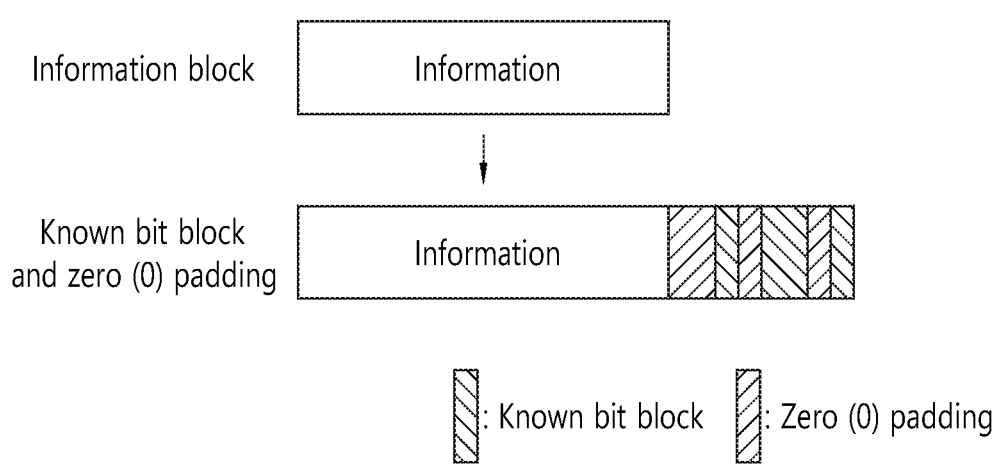
FIG. 6 is a diagram illustrating a method of determining a position on which a known bit block by the LDPC is padded.

FIG. 6 is a diagram illustrating a method of determining a position on which a known bit block by the LDPC is padded.

Referring to FIG. 6, a position on which the known bit block is padded may be determined based on reliability for an RNTI. That is, the known bit block may be positioned on a position that increases reliability for the RNTI.

According to an embodiment, the position of the known bit block may be determined to a position that significantly influences on a parity bit block when the LDPC encoding is performed. The known bit block is removed in encoding and not actually transmitted, a terminal may assume the known bit block by using the parity bit block of the information bit block, and accordingly, the position of the known bit block may be determined to a position that significantly influences on the parity bit block.

For example, in the case that there are K positions (K is a natural number) on which zero padding is available with the known bit block and L (L is a natural number) known bit blocks are used, L known bit blocks are arranged in an order of significantly influencing a bit of the parity bit block, and zero padding may be performed on the remaining positions.

According to an embodiment, the fact of influencing on the parity bit block may mean that there are many is among LDPC encoding input bits.

FIG. 7 illustrates a method of masking RNTI by using a CRC and a known bit block when channel coding is performed by using the LDPC.

Referring to FIG. 7, a base station that performs channel coding by using the LDPC may mask the RNTI information by using a CRC and a known bit block. The RNTI information may include a first RNTI represented by using the CRC and a second RNTI represented by using the known bit block.

For example, in the case that the RNTI information is N bits (N is a natural number), N1 bits (N1 is a natural number) may be represented by using the CRC and N2 bits (N2=N−N1) may be represented by using known bit block. This may be used for solving the problem that there is a restriction in representing the RNTI using only the known bit block owing to a size limitation of an LDPC encoding bit, in the case that the CRC length is limited or intended to decrease overhead due to the CRC.

The terminal performs decoding by using the bit information of the second RNTI that corresponds to the known bit block, and then calculates the CRC by considering the RNTI masking effect to which the bit information of the first RNTI is applied, and accordingly, the terminal may distinguish the RNTI.

Figure 8A:
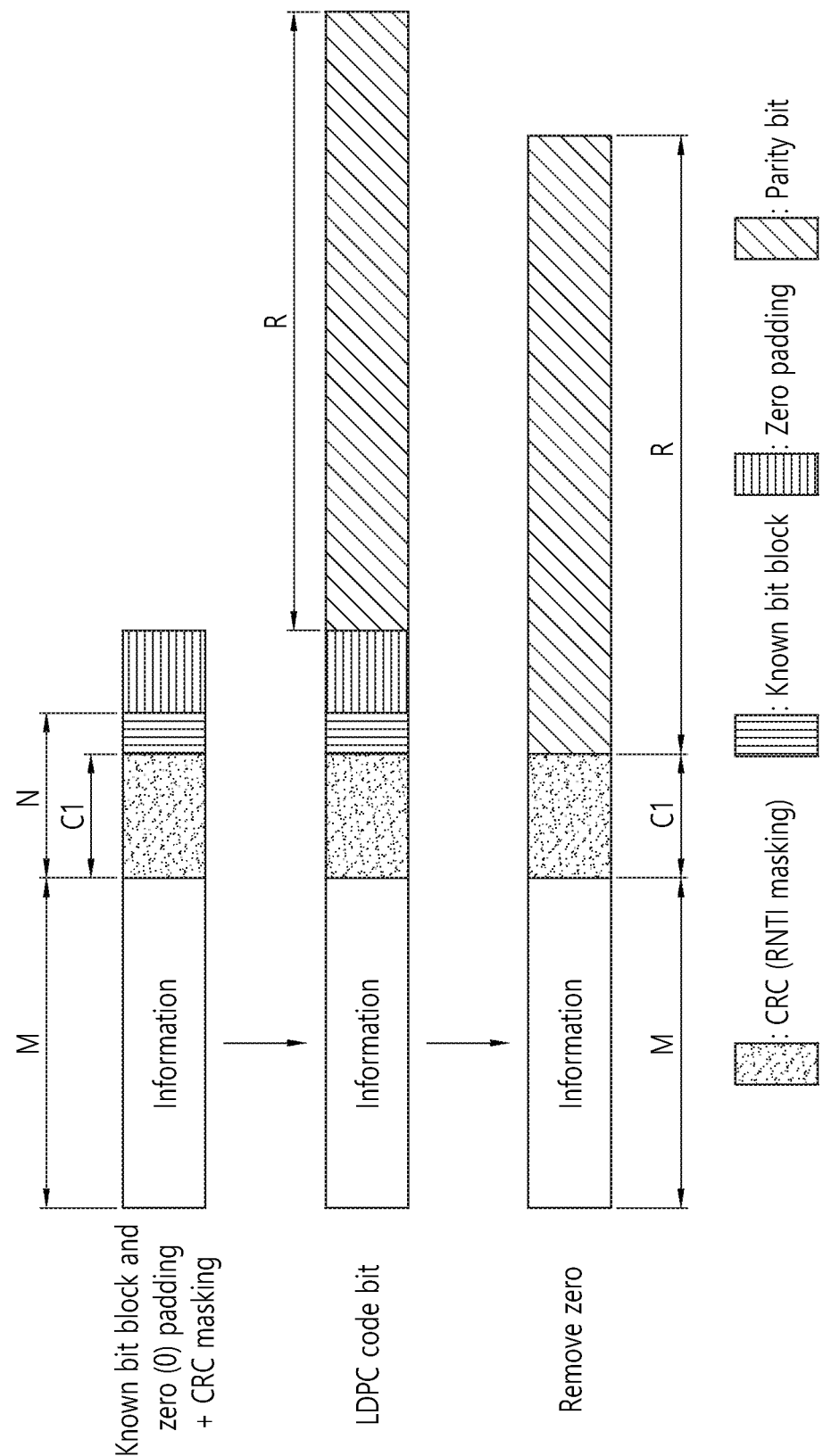
FIGS. 8a and 8b illustrate a method of adjusting a size of a CRC and a known bit block according to an embodiment of the present invention.
Figure 8B:
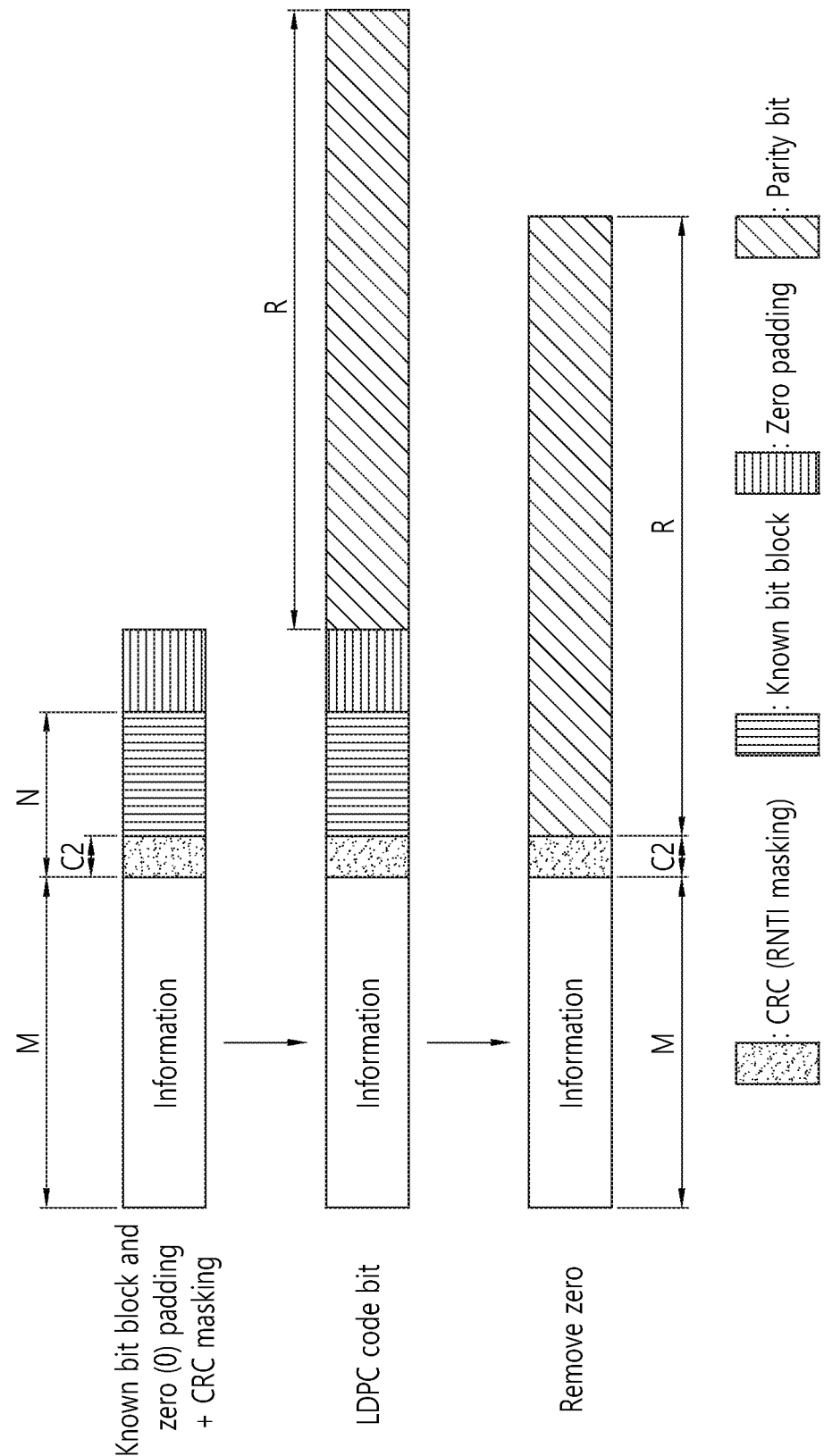

FIGS. 8a and 8b illustrate a method of adjusting a size of a CRC and a known bit block according to an embodiment of the present invention.

In the case that the RNTI is masked by using the CRC and the known bit block, sizes of the CRC and the known bit block may be changed. For example, the sizes of the CRC and the known bit block may be determined depending on a size of transmitted signal.

In the case that the RNIT is distinguished by using the CRC, there is an advantage that error detection is available, but there is also disadvantage that it occurs overhead. On the other hand, in the case that the RNIT is distinguished by using the known bit block, there is an advantage that transmission overhead does not occur, but there is disadvantage that error detection is not available. Accordingly, in order to compensate the CRC and the known bit block, the RNTI may be distinguished by using both of the CRC and the known bit block.

As shown in FIG. 8a, in the case that there is a capacity in transmittable overhead, a size of the CRC may be great, and a size of the known bit block may be small. The RNTI information may be divided according to a ratio between the size of the CRC and the size of the known bit block. For example, in the case that the RNTI information is N bit (N is a natural number) and a size of usable CRC is C1 bit (C1 is a natural number), the first RNTI having a size of C1 bit may be represented by using the CRC, and the second RNTI having a size of (N−C1) bit may be represented by using the known bit block. In addition, in the case that a size of the information bit block is M bit (M is a natural number) and a size of the parity bit block is R bit (R is a natural number), a size of the signal which is LDPC encoded may be (M+R+C1) bit.

On the other hand, as shown in FIG. 8b, in the case that there is a restriction in the transmittable overhead, a size of the CRC may be small, and a size of the known bit block may be great. For example, in the case that the RNTI information is N bit (N is a natural number) and a size of usable CRC is C2 bit which is different from C1 (C2 is a natural number), the first RNTI having a size of C2 bit may be represented by using the CRC, and the second RNTI having a size of (N−C2) bit may be represented by using the known bit block. In addition, in the case that a size of the information bit block is M bit (M is a natural number) and a size of the parity bit block is R bit (R is a natural number), a size of the signal which is LDPC encoded may be (M+R+C2) bit.

Referring to FIG. 8a and FIG. 8b, in order to reduce the number of parity blocks being punctured, of the LDPC encoding signal being punctured, the size of the CRC and the size of the known bit block may be adjusted.

Referring to FIG. 8a and FIG. 8b, in the case that a part of block is punctured to perform a rate matching to a signal intended to transmit, as the size of the CRC increases, the size of the parity bit being punctured may be greater. That is, as shown in FIG. 8a and FIG. 8b, when C1>C2, the size of the parity bit being punctured may be greater for the CRC of C2 bit rather than the CRC of C1 bit. Accordingly, in the case that the smaller size of CRC is used as shown in FIG. 8b, there is an advantage that more redundancy may be transmitted.

In the case that the size of the CRC and the size of the known bit block are changed according to FIG. 8a and FIG. 8b, the terminal that receives a signal may require the information for the size of the CRC and the size of the known bit block. Depending on an embodiment, the size of the CRC of a transmitted signal may be informed through RRC signaling or DCI. In addition, depending on an embodiment, in order to reduce signaling overhead and complexity of a transceiver unit, the size of the CRC may be tabled and the size of the CRC of the transmitted signal may be informed through an indicator indicating an index of the table.

FIG. 9 illustrates a method of applying a known bit block when polar code is used according to an embodiment of the present invention.

Referring to FIG. 9, in the case that channel coding is performed by using the polar code, the known bit block may be positioned on a frozen bit of the information block. That is, instead of zero bit, the known bit block may be inserted in the frozen bit in which data is not transmitted in the polar code.

In the case that values of all frozen bits are mapped to 0, a receiving unit (terminal) may perform decoding by assuming that the value of frozen bit is 0. However, as in the present invention, in the case that the terminal knows that the known bit block is positioned on the frozen bit and the value of the known bit block, the receiving unit (terminal) may perform decoding based on the known position and value.

For example, in the case that a size of an input signal of a polar code encoder is N bit (N is a natural number), a size of the information block is M bit (N is a natural number), and a size of the known bit block is K bit (K is a natural number), when M+K<N, a transmitting unit (base station) may perform encoding by maintaining a size of input of the encoder to N bit.

The receiving unit (terminal) may perform decoding by assuming that the known bit block corresponding to an RNTI expected to be received is a fixed value. In the case that decoding is performed without an error, the receiving unit (terminal) may determine that the expected RNTI is included in the received signal. On the other hand, in the case that an error is occurred in decoding, the receiving unit (terminal) may determine that an RNTI, which is different from the expected RNTI, is included in the received signal.

According to the method shown in FIG. 9, the RNTI may be distinguished while a mother code rate of the polar code is not changed. Referring to FIG. 9, the known bit block is generated based on the RNTI information, and the generated known bit block may be inserted in the frozen bit.

Different from FIG. 9, in the case that a terminal should perform blind decoding to different RNTIs, there is one or more values of the known bit block corresponding to the different RNTIs. In addition, in the case that the terminal should perform blind decoding to one or more known bit blocks and the terminal is available to perform list decoding, the terminal may perform each of reliability calculations of the different known bit blocks via different paths, and decode the different known bit blocks simultaneously. In the case that one of the paths shown a reliability under a reference level during list check procedure, the terminal may perform decoding for the remaining paths except the paths showing the reliability under a reference level. This is for prevent increase of decoding complexity and/or decoding latency in the case that error check is performed on the known bit block based on a wrong RNTI when the terminal performs decoding for one or more RNTIs. Depending on an embodiment, the reliability may be log-likelihood ratio (LLR).

Figure 10A:
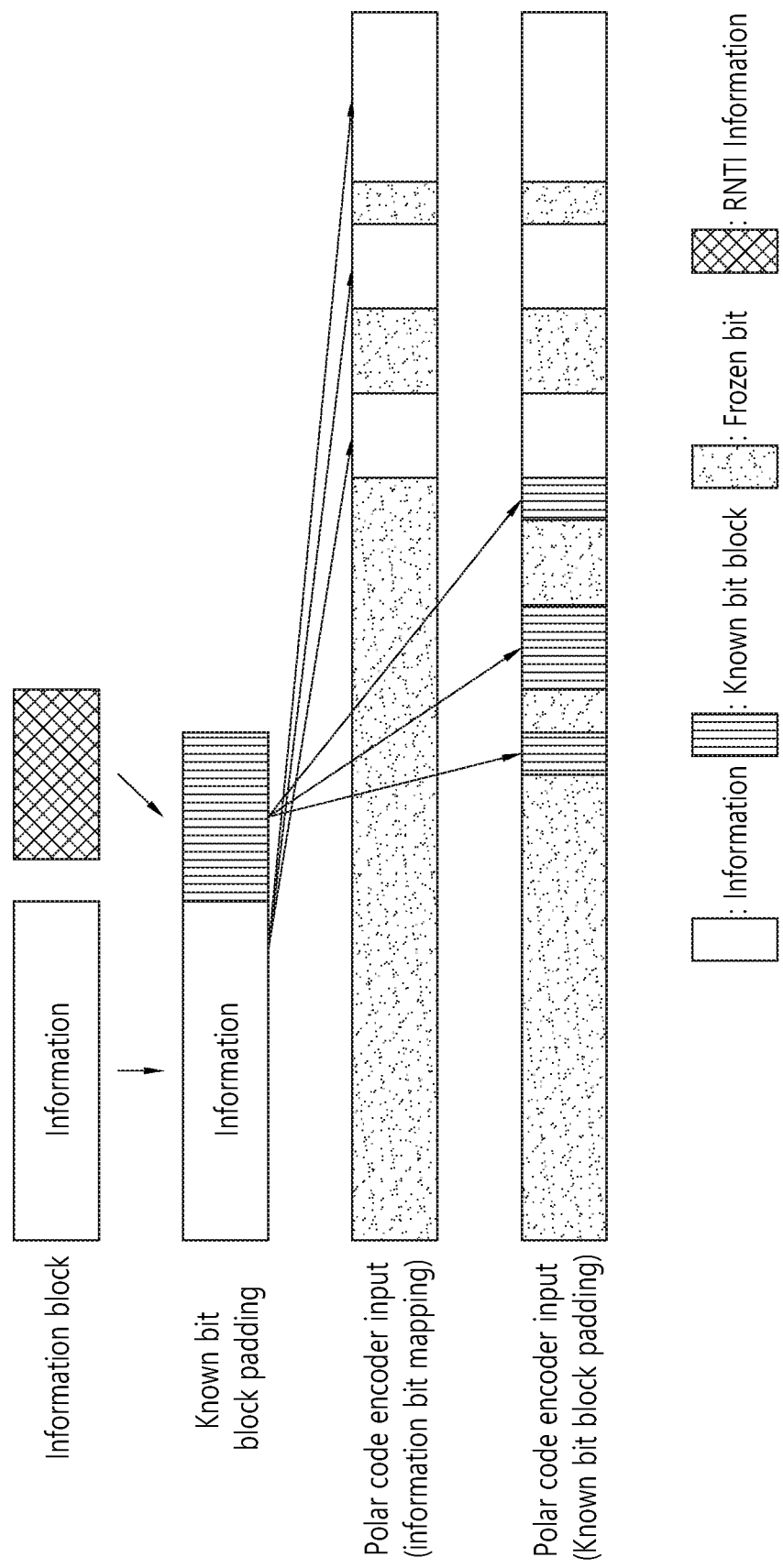
FIGS. 10a and 10b illustrate a method of determining a position of known bit block according to an embodiment of the present invention.
Figure 10B:
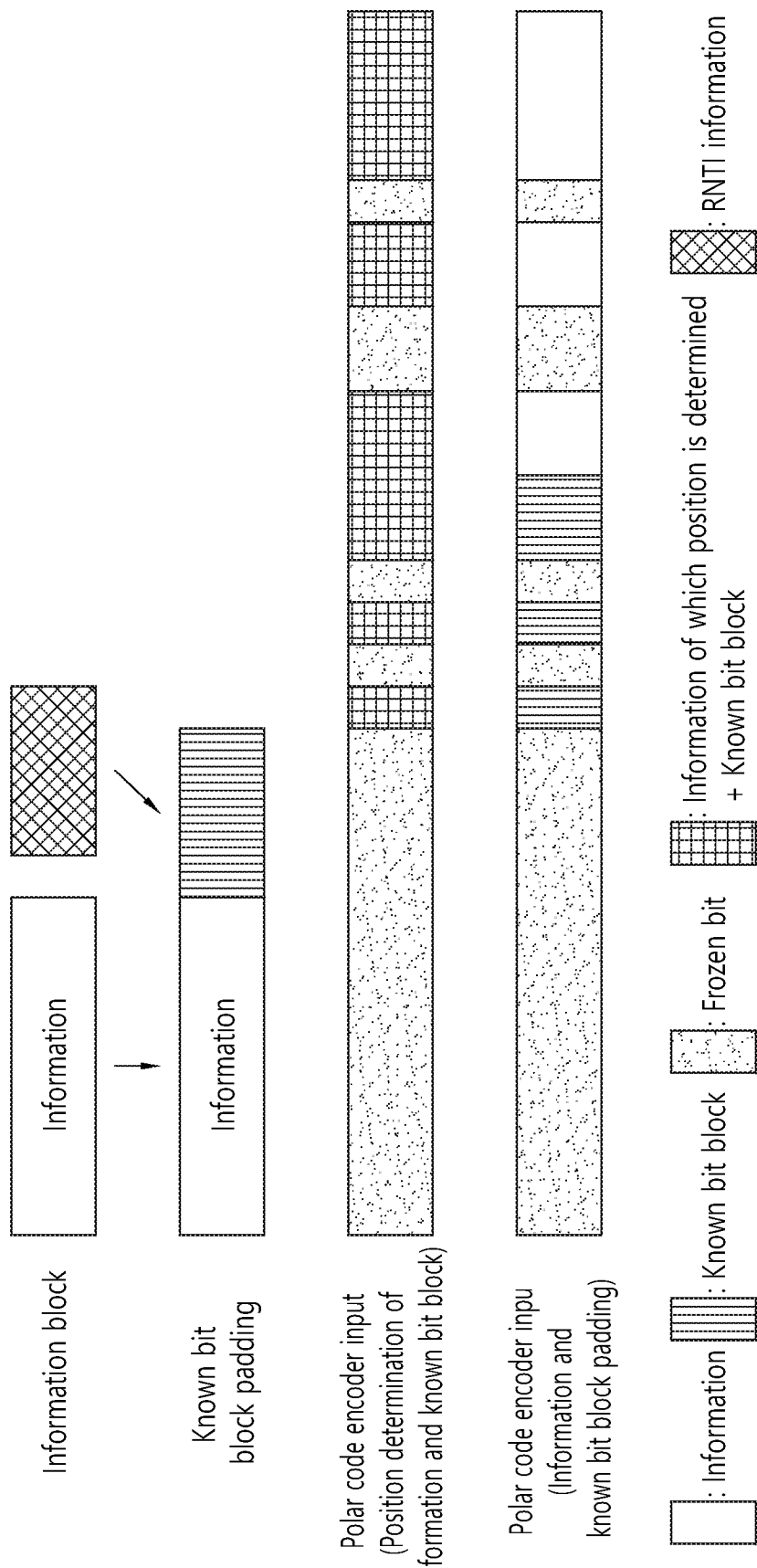

FIGS. 10a and 10b illustrate a method of determining a position of known bit block according to an embodiment of the present invention.

Referring to FIG. 10a and FIG. 10b, a position of the known bit block in a polar code encoder may be determined according to an order of which effective channel capacity is high considering polarization effect. A position of the information bit may also be selected in the same method as that of the known bit block, after the position of the information bit is determined first, a position to be used may be selected among the remaining positions by the known bit block. This is for increasing influence on the result of the polar code encoder output by the known bit block and increasing reliability of the known bit block when the receiving unit (terminal) performs decoding.

For example, in the case that K positions may be used for the known bit block and the frozen bit and a size of the known bit block is N, bits of the known bit block may select the position that may significantly influence on the output of the encoder (or having a channel of which reliability is high), and input a zero bit in the frozen bit of the remaining positions. Depending on an embodiment of the present invention, the criterion of selecting the position of the known bit block may be changed in the same way of the criterion of selecting the position of the known bit block.

As the known bit block is disposed on a position of which reliability is relatively high, the known bit block may further influence on the decoding result. That is, in the case that a position of the known bit block is selected as the position that may significantly influence on the output of the encoder (or having a channel of which reliability is high), when decoding the polar code such as successive cancellation list (SCL) decoding, a value such as LR (or LRR) may be used for updating a path matrix. In this case, the path matrix may be for the purpose of reflecting an influence on different bit to a path of each list when information for the known bit block is decoded.

According to an embodiment, the known bit block may be positioned faster than an initially decoded information bit in the decoding procedure of polar code such as SCL decoding. In the case that the known bit block is positioned ahead of the information bit, the information bit may be decoded based on all the known bit blocks when the information bit is decoded.

According to an embodiment, FIG. 10a shows a method of determining a position of the known bit block, after determining a position of the information bit, to at least one of the frozen bits located ahead of the information bit. Here, 'ahead' means that the known bit block is decoded timely before the information bit. By the method shown in FIG. 10a, the position of the known bit block may be determined while reliability of the information bit is maintained without any change.

According to another embodiment, FIG. 10b shows a method, considering the entire number of the information bit and the known bit block, after determining a bit position of which reliability is high (or according to unfrozen bit selection criterion), of disposing the known bit block on a position on which the known bit block is decoded before the information bit. This may be for increasing reliability of bit position to which the known bit block is mapped.

Figure 11:
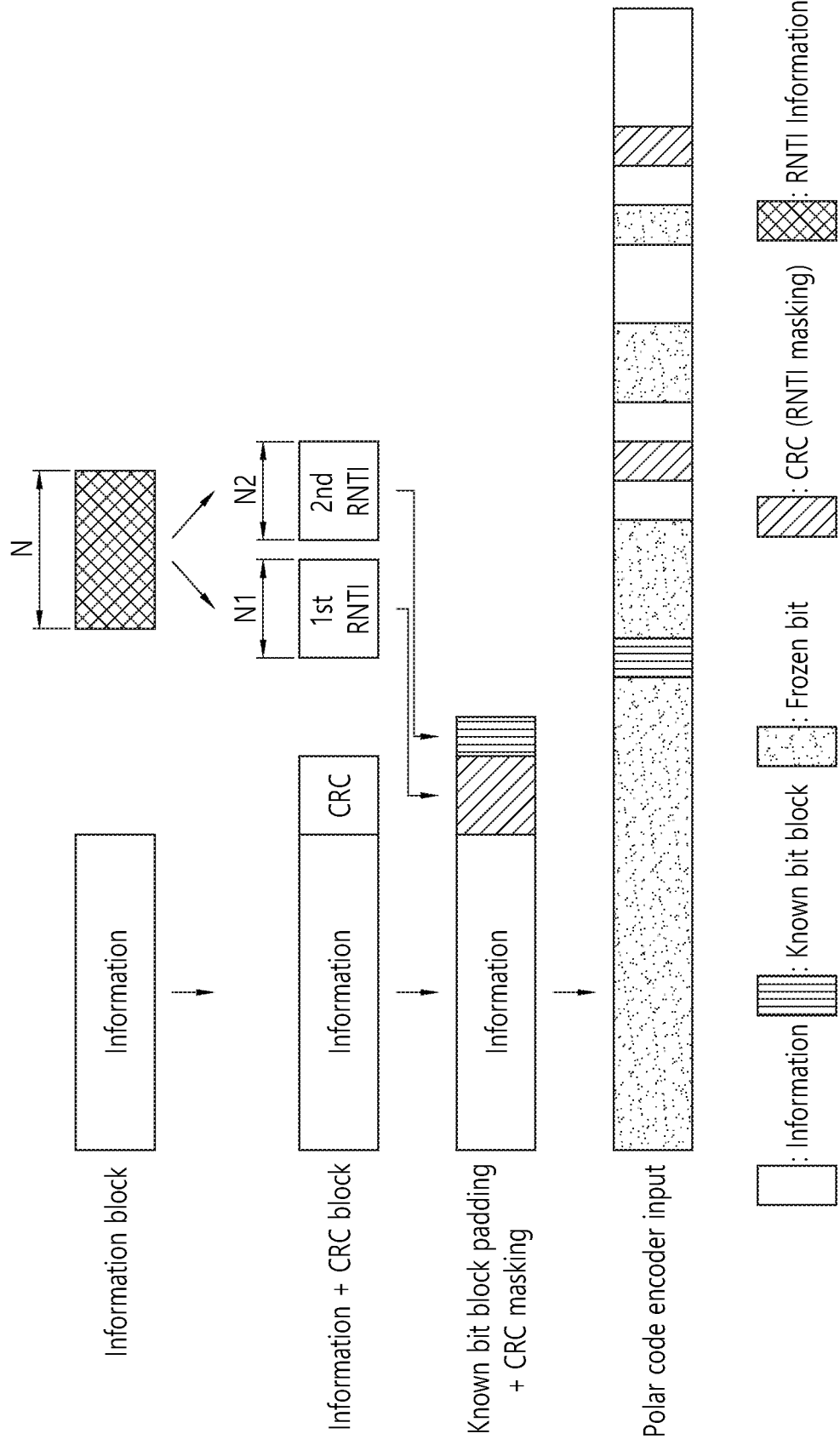
FIG. 11 illustrates a method of masking an RNTI by using a CRC and a known bit block when channel coding is performed by using polar code.

FIG. 11 illustrates a method of masking an RNTI by using a CRC and a known bit block when channel coding is performed by using polar code.

Referring to FIG. 11, a base station that performs channel coding by using the polar code may mask the RNTI information by using the CRC and the known bit block. The RNTI information may include a first RNTI represented by using the CRC and a second RNTI represented by using the known bit block.

For example, in the case that the RNTI information has a size of N bits (N is a natural number), N1 bits (N1 is a natural number) may be represented by using the CRC and N2 bits (N2=N−N1) may be represented by using known bit block. This may be used for solving the problem that there is a restriction in representing the RNTI using only the known bit block owing to a size limitation of an LDPC encoding bit, in the case that the CRC length is limited or intended to decrease overhead due to the CRC.

After the terminal performs decoding by using bit information of the second RNTI corresponding to the known bit block, the terminal may distinguish RNTI by calculating the CRC considering the RNTI masking effect to which bit information of the first RNTI is applied.

The terminal performs decoding by using the bit information of the second RNTI that corresponds to the known bit block, and then calculates the CRC by considering the RNTI masking effect to which the bit information of the first RNTI is applied, and accordingly, the terminal may distinguish the RNTI.

Different from what is shown FIG. 11, according to an embodiment, the base station may mask the RNTI by using the CRC and the known bit block to transmit two or more RNTIs simultaneously. For example, in the case that there are two different RNTI information, one RNTI may be masked by using the known bit block, and another RNTI may be masked by using the CRC.

What has been described so far can be implemented in hardware.

Figure 12:
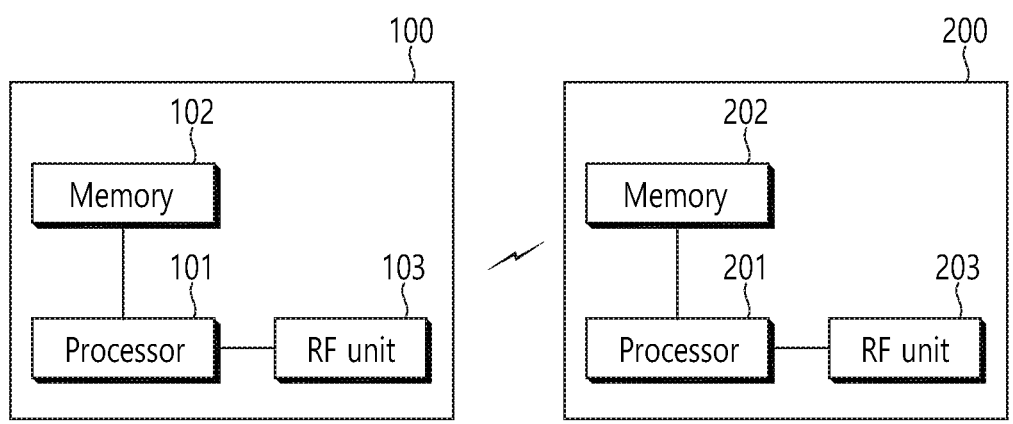
FIG. 12 is a block diagram illustrating a wireless communication system in accordance with one embodiment of the present disclosure.

FIG. 12 is a block diagram illustrating a wireless communication system in accordance with one embodiment of the present disclosure.

The base station 200 includes a processor 201, a memory 202 and a RF unit 203. The memory 202 is connected with the processor 201 to store various pieces of information for driving the processor 220. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

The UE 100 includes a processor 101, a memory 102 and a RF unit 103. The memory 102 is connected with the processor 101 to store various pieces of information for driving the processor 101. The RF unit 103 is connected with the processor 101 to transmit and/or receive the radio signal. The processor 101 implements a function, a process, and/or a method which are proposed. In the above-described embodiment, the operation of the wireless device may be implemented by the processor 101.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for performing decoding by a terminal, the method comprising:
   receiving, from a base station, a signal including an information bit and a frozen bit; and
   decoding the signal based on a polar code,
   wherein the decoding the signal is performed by using a known bit block included in the frozen bit,
   wherein the terminal and the base station know the known bit block before receiving the signal,
   wherein the known bit block is generated by using a radio network temporary identifier (RNTI),
   wherein a position of the known bit block is determined after a position of the information bit is determined first in the signal, and
   wherein, the position of the known bit block is determined among remaining positions except a position of the information bit determined in the signal according to a same criterion as a criterion of determining the position of the information bit.

2. The method of claim 1, when an error is not occurred as a result of decoding, further comprising, by the terminal, determining that the RNTI is received, which is expected to be received by the known bit block included in the frozen bit.

3. The method of claim 1, when an error is occurred as a result of decoding, further comprising, by the terminal, determining that an RNTI is received, which is different from an RNTI expected to be received by the known bit block included in the frozen bit.

4. The method of claim 1, when a cyclical redundancy check (CRC) bit has higher reliability than the known bit block, wherein the CRC bit includes a first RNTI of which importance is high RNTIs received by the terminal, and wherein the known bit block includes a second RNTI of which importance is low among the RNTIs, and when the known bit block has higher reliability than the CRC bit, wherein the known bit block includes a first RNTI of which importance is high among RNTIs received by the terminal, and wherein the CRC bit includes a second RNTI of which importance is low among the RNTIs.

5. A terminal for performing decoding, comprising:
a radio frequency (RF) unit configured to receive a signal including an information bit and a frozen bit; and
a transceiver; and
a processor operatively coupled to the transceiver, and the processor is configured to:
receive, via the transceiver a signal including an information bit and a frozen bit from a base station; and
decode the signal based on a polar code,
wherein the processor is configured to perform decoding by using a known bit block included in the frozen bit,
wherein the terminal and the base station know the known bit block before receiving the signal,
wherein the known bit block is generated by using a radio network temporary identifier (RNTI),
wherein a position of the known bit block is determined after a position of the information bit is determined first in the signal, and
wherein, the position of the known bit block is determined among remaining positions except a position of the information bit determined in the signal according to a same criterion as a criterion of determining the position of the information bit.

6. The terminal of claim 5, when an error is not occurred as a result of decoding, wherein the terminal determines that the RNTI is received, which is expected to be received by the known bit block included in the frozen bit.

7. The terminal of claim 5, when an error is occurred as a result of decoding, wherein the terminal determines that an RNTI is received, which is different from an RNTI expected to be received by the known bit block included in the frozen bit.

8. The terminal of claim 5, when a cyclical redundancy check (CRC) bit has higher reliability than the known bit block, wherein the CRC bit includes a first RNTI of which importance is high among RNTIs received by the terminal, and wherein the known bit block includes a second RNTI of which importance is low among the RNTIs, and
when the known bit block has higher reliability than the CRC bit, wherein the known bit block includes a first RNTI of which importance is high among RNTIs received by the terminal, and wherein the CRC bit includes a second RNTI of which importance is low among the RNTIs.

* * * * *